United States Patent [19]
Kiyama et al.

[11] Patent Number: 5,551,036
[45] Date of Patent: Aug. 27, 1996

[54] METHOD AND SYSTEM FOR GENERATING OPERATION SPECIFICATION OBJECT INFORMATION

[75] Inventors: Tadahiro Kiyama, Yao; Hisao Mase, Hirakata; Hiroshi Tsuji, Itami; Hiroshi Kinukawa, Machida, all of Japan

[73] Assignee: Hitachi, Ltd., Tokyo, Japan

[21] Appl. No.: 104,173

[22] Filed: Aug. 9, 1993

[30] Foreign Application Priority Data

Aug. 21, 1992 [JP] Japan .................................. 4-222318

[51] Int. Cl.$^6$ .................................. G06F 17/20
[52] U.S. Cl. .................................. 395/700; 395/600
[58] Field of Search .................................. 395/700, 600; 364/419.01, 419.02, 419.04, 419.05, 419.06, 419.08

[56] References Cited

U.S. PATENT DOCUMENTS 5,068,789  11/1991  van Vliembergen ............ 364/DIG. 2
5,161,105  11/1992  Kugimiya et al. ...................... 364/419
5,371,674  12/1994  Obuchi .............................. 364/419.05

FOREIGN PATENT DOCUMENTS 2-62663  3/1990  Japan .

OTHER PUBLICATIONS

Kinukawa, Hiroshi. "A Natural Language Interface Processor Based on the Hierarchical-Tree Structure Model of Relation Tables," Journal of Information Processing, vol. 11, No. 2, 1988, pp. 83–91.

*Primary Examiner*—Thomas M. Heckler
*Attorney, Agent, or Firm*—Fay, Sharpe, Beall, Fagan, Minnich, & Mckee

[57] ABSTRACT

A system for changing a natural language sentence input by a user. The sentence expresses an operation specification which is translated to an operation specification command in a machine language for an operation specification object such as database. The system has a function to define specific items necessary for changing the natural language input sentence to the operation specification command without forcing the user to decide complicated definitions related to the operation specification object. The system refers to an operation specification object information table which stores at least one of the following acquired from the user:

(1) A unit word or an interrogative word (phrase) with respect to each of the items in the database;

(2) An explanatory sentence with respect to each of the items in the database; and (3) An item pair which is specifiable as a join condition of each of the items in the database.

21 Claims, 16 Drawing Sheets

FIG. 3

1-1
GOODS TABLE

| GOOD NAME | PRICE | SHOP NAME |
|---|---|---|
| MISO-RAAMEN | 500 | HITACHI HANTEN |
| RAAMEN | 450 | HITACHI HANTEN |
| MIXSANDWITCH | 450 | TEAHOUSE TSURUKAME |
| COFFEE | 300 | CAFE TSURUKAME |
| TABLE D'HOTE A | 1250 | HITACHI TEI |
| ⋮ | ⋮ | ⋮ |

1 DATABASE 1-2
SHOP TABLE

| SHOP NAME | LOCATION | OWNER'S NAME | REGULAR HOLIDAY | ANNUAL TURNOVER |
|---|---|---|---|---|
| HITACHI HANTEN | SHINJUKU | HITACHI TARO | MONDAY | 12000000 |
| TEAHOUSE TSURUKAME | SHIBUYA | TSURUKAME JIRO | WEDNESDAY | 9000000 |
| CAFE TSURUKAME | SHIBUYA | TSURUKAME HANAKO | SUNDAY | 7500000 |
| HITACHI TEI | SHINJUKU | HITACHI TOMEKICHI | MONDAY | 25000000 |
| ⋮ | ⋮ | ⋮ | ⋮ | ⋮ |

FIG. 5

4 OPERATION SPECIFICATION OBJECT STRUCTURE INFORMATION TABLE

| | K1 | K2 | K3 | K4 |
|---|---|---|---|---|
| | TABLE NAME | ITEM NAME | ATTRIBUTE | ITEM CODE |
| | GOODS TABLE | GOOD NAME | CHARACTER STRING | A1 |
| | GOODS TABLE | PRICE | NUMERICAL VALUE | A2 |
| | GOODS TABLE | SHOP NAME | CHARACTER STRING | A3 |
| | SHOP TABLE | SHOP NAME | CHARACTER STRING | B1 |
| | SHOP TABLE | LOCATION | CHARACTER STRING | B2 |
| | SHOP TABLE | OWNER'S NAME | CHARACTER STRING | B3 |
| | SHOP TABLE | REGULAR HOLIDAY | CHARACTER STRING | B4 |
| | SHOP TABLE | ANNUAL TURNOVER | NUMERICAL VALUE | B5 |

FIG. 7

6 OPERATION SPECIFICATION OBJECT INFORMATION TABLE

| ITEM NAME | ITEM CODE | UNIT WORD | INTERROGATIVE PRONOUN |
|---|---|---|---|
| H1 | H2 | H3 | H4 |
| GOOD NAME | A1 | | WHAT |
| PRICE | A2 | YEN | HOW MUCH |
| SHOP NAME | A3 | | WHERE |
| SHOP NAME | B1 | | WHERE |
| LOCATION | B2 | | WHERE |
| OWNER'S NAME | B3 | SAN | WHO |
| REGULAR HOLIDAY | B4 | | WHEN |
| ANNUAL TURNOVER | B5 | YEN | HOW MUCH |

FIG. 9

6  OPERATION SPECIFICATION OBJECT INFORMATION TABLE

| ITEM NAME | ITEM CODE | UNIT WORD | INTERROGATIVE PRONOUN | EXPLANATORY SENTENCE |
|---|---|---|---|---|
| GOOD NAME | A1 | | WHAT | NAME OF THE GOOD |
| | | | | "GOOD NAME" WHICH THE "SHOP NAME" PROVIDES |
| | | | | MENU PROVIDED BY THE "SHOP NAME" |
| | | | | "GOOD NAME" PRODUCED BY THE "SHOP NAME" |
| | | | | MENU PRODUCED BY THE "SHOP NAME" |
| | | | | "GOOD NAME" THAT CAN BE EAT IN THE "SHOP NAME" |
| | | | | MENU FOR WHAT CAN BE EAT IN THE "SHOP NAME" |
| PRICE | A2 | YEN | HOW MUCH | "PRICE" OF THE "GOOD NAME" |
| SHOP NAME | A3 | | WHERE | NAME OF THE SHOP |
| | | | | "SHOP NAME" PROVIDING THE "GOOD NAME" |
| | | | | "SHOP NAME" PRODUCING THE "GOOD NAME" |
| | | | | "SHOP NAME" WHERE THE "GOOD NAME" CAN BE EAT |
| | | | | "SHOP NAME" WHERE ONE CAN EAT THE "GOOD NAME" |
| SHOP NAME | B1 | | WHERE | NAME OF THE SHOP |
| | | | | SHOP OPERATED BY THE "OWNER'S NAME" |
| LOCATION | B2 | | WHERE | "LOCATION" OF THE "SHOP NAME" |
| | | | | PLACE WHERE THERE IS THE "SHOP NAME" |
| OWNER'S NAME | B3 | SAN | WHO | "OWNER'S NAME" OF THE "SHOP NAME" |
| | | | | MASTER'S NAME OF THE "SHOP NAME" |
| | | | | A PERSON OPERATING THE "SHOP NAME" |
| REGULAR HOLIDAY | B4 | | WHEN | "REGULAR HOLIDAY" OF THE "SHOP NAME" |
| | | | | HOLIDAY OF THE "SHOP NAME" |
| ANNUAL TURNOVER | B5 | YEN | HOW MUCH | "ANNUAL TURNOVER" OF THE "SHOP NAME" |
| | | | | ANNUAL SALES AMOUNT OF THE "SHOP NAME" |
| | | | | ANNUAL PROFIT OF THE "SHOP NAME" |

FIG. 11

6  OPERATION SPECIFICATION OBJECT INFORMATION TABLE

| ITEM NAME | ITEM CODE | UNIT WORD | INTERROGATIVE PRONOUN | EXPLANATORY SENTENCE | JOIN NAME |
|---|---|---|---|---|---|
| GOOD NAME | A 1 | | WHAT | NAME OF THE GOOD | |
| | | | | "GOOD NAME" WHICH THE "SHOP NAME" PROVIDES | |
| | | | | MENU PROVIDED BY THE "SHOP NAME" | |
| | | | | "GOOD NAME" PRODUCED BY THE "SHOP NAME" | |
| | | | | MENU PRODUCED BY THE "SHOP NAME" | |
| | | | | "GOOD NAME" THAT CAN BE EAT IN THE "SHOP NAME" | |
| | | | | MENU FOR WHAT CAN BE EAT IN THE "SHOP NAME" | |
| PRICE | A 2 | YEN | HOW MUCH | "PRICE" OF THE "GOOD NAME" | |
| SHOP NAME | A 3 | | WHERE | NAME OF THE SHOP | B 1 |
| | | | | "SHOP NAME" PROVIDING THE "GOOD NAME" | |
| | | | | "SHOP NAME" PRODUCING THE "GOOD NAME" | |
| | | | | "SHOP NAME" WHERE THE "GOOD NAME" CAN BE EAT | |
| | | | | "SHOP NAME" WHERE ONE CAN EAT THE "GOOD NAME" | |
| SHOP NAME | B 1 | | WHERE | NAME OF THE SHOP | A 3 |
| | | | | SHOP OPERATED BY THE "OWNER'S NAME" | |
| LOCATION | B 2 | | WHERE | "LOCATION" OF THE "SHOP NAME" | |
| | | | | PLACE WHERE THERE IS THE "SHOP NAME" | |
| OWNER'S NAME | B 3 | SAN | WHO | "OWNER'S NAME" OF THE "SHOP NAME" | |
| | | | | MASTER'S NAME OF THE "SHOP NAME" | |
| | | | | A PERSON OPERATING THE "SHOP NAME" | |
| REGULAR HOLIDAY | B 4 | | WHEN | "REGULAR HOLIDAY" OF THE "SHOP NAME" | |
| | | | | HOLIDAY OF THE "SHOP NAME" | |
| ANNUAL TURNOVER | B 5 | YEN | HOW MUCH | "ANNUAL TURNOVER" OF THE "SHOP NAME" | |
| | | | | ANNUAL SALES AMOUNT OF THE "SHOP NAME" | |
| | | | | ANNUAL PROFIT OF THE "SHOP NAME" | |

FIG. 12

A METHOD FOR DESIGNATING A UNIT WORD IS EXPLAINED

FOR EXAMPLE, LET THERE BE "5,000" AS A DATUM OF A COLUMN OF "SALES UNIT PRICE". IF IN THIS CASE, YOU CAN SAY "THE SALES UNIT PRICE IS 5,000 YEN", THEN THE UNIT OF THE "SALES UNIT PRICE" IS "¥".
  BESIDES, "MR." FOR "MR.~" OF A PERSON'S NAME IS A UNIT WORD, IF IT BE LENGTH, SUCH AS "M", "CM" FOR A LENGTH "~M", OR "~CM" IS A UNIT WORD.

FIG. 13

A METHOD FOR DESIGNATING INTERROGATIVE PRONOUN IS EXPLAINED

FOR EXAMPLE, WHEN THERE IS A COLUMN OF "FULL NAME", AND A "FULL NAME" IS A RETRIEVING OBJECT, PLEASE CONSIDER WHAT INTERROGATIVE PRONOUN IS TO BE USED, AND SELECT THE BEST FITTED AMONG THE FOLLOWING 5 CASES. E.G. "WHO" IS THE BEST FITTED IN CASE OF "FULL NAME".
(1) WHO (WHEN THE COLUMN NAME INDICATES A PERSONAL NAME),
(2) WHEN (WHEN THE COLUMN NAME INDICATES TIME),
(3) WHERE (WHEN THE COLUMN NAME INDICATES PLACE),
(4) HOW MUCH, HOW MANY, TO WHAT EXTENT (WHEN THE COLUMN NAME INDICATES, NUMBER, ORDER ETC.)
(5) WHAT (OTHER THAN THE ABOVE (1)-(4))

FIG. 14

A METHOD OF COMPOSING AN EXPLANATORY SENTENCE TO THE COLUMN IS EXPLAINED

| FULL NAME | RESIDENCE | WORKING PLACE |
|---|---|---|
| HITACHI TARO | TOKYO | A INC. |
| HITACHI HANAKO | KANAGAWA | B INC. |
| ⋮ | ⋮ | ⋮ |

EXPLAINED ACCORDING TO THE ABOVE DB DATA. NEXT ARE THE EXAMPLES OF THE COLUMN AND THE EXPLANATORY SENTENCE

FULL NAME     : (1) PERSONAL NAME
RESIDENCE     : (1) A PLACE WHERE THE "FULL NAME" LIVES
                (2) WHERE THE "FULL NAME" MAKES A LIVING
WORKING PLACE : (1) A PLACE WHERE THE "FULL NAME" IS EMPLOYED
                (2) WHERE THE "FULL NAME" IS WORKING

[METHOD OF COMPOSING EXPLANATORY SENTENCE]

PLEASE EXPLAIN USING OTHER COLUMN NAMES SUCH AS "RESIDENCE", "WORKING PLACE" ETC.. AND PLEASE ENCLOSE THE QUOTED COLUMN NAME WITH A QUOTATION MARK " " " ". PLEASE USE DECLINABLE WORDS IN THE EXPLANATORY SENTENCE, AS MANY AS POSSIBLE. BUT, IN CASE YOU CANNOT QUOTE ANOTHER COLUMN NAME SUCH AS "A PERSONAL NAME" OF "FULL NAME", YOU ARE NOT FORCED TO QUOTE. YOU CAN COMPOSE AS MANY EXPLANATORY SENTENCES AS YOU LIKE IF MORE THAN ONE.

INPUT SENTENCE 1 :  HOW MUCH IS MISO-RAAMEN?

INPUT SENTENCE 2 :  WHERE IS HITACHIHANTEN?

INPUT SENTENCE 3 :  MR. HITACHI TARO'S SHOP IS?

INPUT SENTENCE 4 :  A GOOD OF 500YEN IS?

INPUT SENTENCE 5 :  A PERSON OPERATING TSURUKAME TEASHOP IS?

INPUT SENTENCE 6 :  THE SHOP TSURUKAME JIRO IS OPERATING IS?

INPUT SENTENCE 7 :  PRICE OF A GOOD PROVIDED BY THE MR. HITACHI TARO'S SHOP IS?

FIG. 17

INTERROGATORY PRONOUN TABLE

G 1

| INTERROGATORY PRONOUN CHARACTER STRING |
|---|
| WHO |
| WHERE |
| WHAT |
| WHEN |
| HOW MUCH |
| TO WHAT EXTENT |
| WHAT KIND OF |

FIG. 18

UNIT WORDS TABLE

T 1

| UNIT WORD CHARACTER STRING |
|---|
| YEN, ¥ |
| DOLLAR, $ |
| METER, m |
| CENTI METER, cm |
| GRAM, g |
| KILO GRAM, kg |
| STEP, s |
| KILO STEP, ks |
| MINUTE |
| SECOND |
| SAN(MR. MS. MISS, MRS.) |
| KUN(MR.) |
| SHI(MR.) |
| . |
| . |
| . |

FIG. 19

```
REGARDING "GOOD NAME" OF THE "GOODS TABLE"

WITH WHAT INTERROGATORY PRONOUN AMONG THE FOLLOWING
 WOULD YOU ASK?
   PLEASE INPUT THE CORRESPONDING NUMBER.

1. WHO            2. WHERE          3. WHAT
   4. WHEN           5. HOW MUCH       6. TO WHAT EXTENT
   7. IN WHAT WAY
```

FIG. 20

```
REGARDING "PRICE" OF THE "GOODS TABLE"

WHAT UNIT WORD AMONG THE FOLLOWING COMES?
     PLEASE INPUT THE CORRESPONDING NUMBER.

1. YEN, ¥
              2. DOLLAR, $
              3. METER
              4. METER, m
              5. CENTI METER, cm
              6. GRAM, g
              7. KILO GRAM, kg
              8. STEP, s
              9. KILO STEP, ks
              0. NEXT CANDIDATE
```

METHOD AND SYSTEM FOR GENERATING OPERATION SPECIFICATION OBJECT INFORMATION

BACKGROUND OF THE INVENTION

1. Field of the Invention

The present invention relates to a method and system for generating operation specification object information and more particularly to a system for generating operation specification object information which is referred to when converting an input sentence representing an operation specification to an operation specification object to an operation specification instruction to a processor and to a method and system for recognizing an operation specification object from an input sentence so as to convert an input sentence representing an operation specification to an operation specification object to an operation specification instruction to a processor.

2. Background of the Invention

A prior art relating to the present invention is indicated, for example, in Japanese Patent Application Laid-Open No. 62663.

According to the above prior art, the determination process of values in a dictionary is standardized by classifying information such as the aspect and directed willingness which specify the relation between the concept and grammatical behavior in a natural language on the basis of the features related to the metalanguage.

By doing this, the burden imposed on a dictionary creator for generating dictionary information is lightened.

The above prior art generates dictionary information for the purpose of machine translation but does not generate operation specification object information which is referred to when converting an input sentence representing an operation specification to an operation specification object to an operation specification instruction to a processor.

Namely, prior art for generating such operation specification object information is not known. Prior art for recognizing an operation specification object from an input sentence with reference to such operation specification object information is also not known.

SUMMARY OF THE INVENTION

An object of the present invention is to provide a method and system for generating operation specification object information which is referred to when converting an input sentence representing an operation specification to an operation specification object to an operation specification instruction to a processor and on the basis of the result, to provide a method and system for recognizing an operation specification object for recognizing an operation specification instruction from an input sentence so as to convert an input sentence representing an operation specification to an operation specification object to an operation specification instruction to a processor.

To accomplish the above object, according to the present invention, a method and system for generating operation specification object information in a system having a function for converting an input sentence representing an operation specification to an operation specification object having a plurality of items to an operation specification instruction to the above operation specification object have at least one setting step (means) among the following first setting step (means) to third setting step (means), namely, the first setting step (means) for setting the correspondence between the word in each item in the above operation specification object and the unit word in correspondence with the word, the second setting step (means) for setting the correspondence between each item in the above operation specification object and the interrogative pronoun in correspondence with the case that the item is selected as a search object, and the third setting step (means) for setting the item pair as a join condition between the above items when instructing a search to the above operation specification object and generate the corresponding operation specification object information on the basis of the result which is set by at least one setting step (means) mentioned above.

The present invention may be classified as follows depending on the point of view.

From the first point of view, the present invention is a method and system for generating operation specification object information which is referred to when converting an input sentence representing an operation specification to an operation specification object to an operation specification instruction to a processor, which set the correspondence between the word in each item in the operation specification object and the unit word in correspondence with the word, and set the correspondence between each item in the operation specification object and the interrogative pronoun in correspondence with the case that the item is selected as a search object, and set the correspondence between each item in the operation specification object and the explanatory sentence for explaining the item, and set the item pair which can be set as a join condition when instructing a search to the operation specification object.

From the second point of view, the present invention is a method and system for recognizing an operation specification object from an input sentence so as to convert an input sentence representing an operation specification to an operation specification object to an operation specification instruction to a processor, which detect unit words existing in the input sentence, and obtain the items corresponding to the above detected unit words with reference to the above generated operation specification object information, and recognize the word just prior to each of the above detected unit words as a word in the above obtained item.

From the third point of view, the present invention is a method and system for recognizing an operation specification object from an input sentence so as to convert an input sentence representing an operation specification to an operation specification object to an operation specification instruction to a processor, which detect interrogative pronouns existing in the input sentence, and obtain the items corresponding to the above detected interrogative pronouns with reference to the above generated operation specification object information, and recognize the obtained items as search object items.

From the fourth point of view, the present invention is a method and system for recognizing an operation specification object from an input sentence so as to convert an input sentence representing an operation specification to an operation specification object to an operation specification instruction to a processor, which detect declinable words existing in the input sentence, and obtain the items corresponding to the explanatory sentence containing the above detected declinable words with reference to the above generated operation specification object information, and recognize the words corresponding to the above detected declinable words as words in the above obtained items.

From the fifth point of view, the present invention is a method and system for recognizing an operation specification object from an input sentence so as to convert an input sentence representing an operation specification to an operation specification object to an operation specification instruction to a processor, which detect declinable words existing in the input sentence, and obtain the explanatory sentence containing the above detected declinable words with reference to the above generated operation specification object information, and detect the postpositional words existing in the input sentence which are the same as the postpositional words in the obtained explanatory sentence, and recognize the words accompanied by the detected postpositional words as words in the items which are accompanied by the postpositional words in the above explanatory sentence.

The present invention having the aforementioned constitution has the following functions.

The method and system for generating operation specification object information from the above first point of view has means for setting the correspondence between the word in each item in the operation specification object and the unit word in correspondence with the word, the correspondence between each item in the operation specification object and the interrogative pronoun in correspondence with the case that the item is selected as a search object, the correspondence between each item in the operation specification object and the explanatory sentence for explaining the item, and the item pair which can be set as a join condition when instructing a search to the operation specification object respectively.

By doing this, the burden imposed on a user is lightened and operation specification object information can be generated simply.

The method and system for generating operation specification object information from each of the above second point of view to the fifth point of view recognize the operation specification object represented by the input sentence on the basis of the unit words, interrogative pronouns, or explanatory sentence with reference to the operation specification object information.

By doing this, the user can instruct an operation to the processor by an input sentence in natural language without performing a complicated definition process for the operation specification object.

The foregoing and other objects, advantages, manner of operation and novel features of the present invention will be understood from the following detailed description when read in connection with the accompanying drawings.

BRIEF DESCRIPTION OF THE DRAWINGS

FIG. 3 is an illustration of the data base shown in FIG. 1.

FIG. 5 is an illustration of the operation specification object structure information table.

FIG. 7 is an illustration of the operation specification object information table which is set by the operation shown in FIG. 6.

FIG. 9 is an illustration of the operation specification object information table which is set by the operation shown in FIG. 8.

FIG. 11 is an illustration of the operation specification object information table which is set by the operation shown in FIG. 10.

FIG. 12 is an illustration of display of a method for designating a unit word to a user.

FIG. 13 is an illustration of display of a method for designating an interrogative pronoun to a user.

FIG. 14 is an illustration of display of a method for designating an explanatory sentence to a user.

FIG. 17 is an illustration of an interrogative pronoun table.

FIG. 18 is an illustration of a unit words table.

FIG. 19 is an illustration of a screen which is used for a user to select a suitable one among predefined interrogative pronouns.

FIG. 20 is an illustration of a screen which is used for a user to select a suitable one among predefined unit words.

DETAILED DESCRIPTION OF THE PREFERRED EMBODIMENTS

Next, the present invention will be explained in detail using the embodiments shown in the accompanying drawings.

Figure 1:
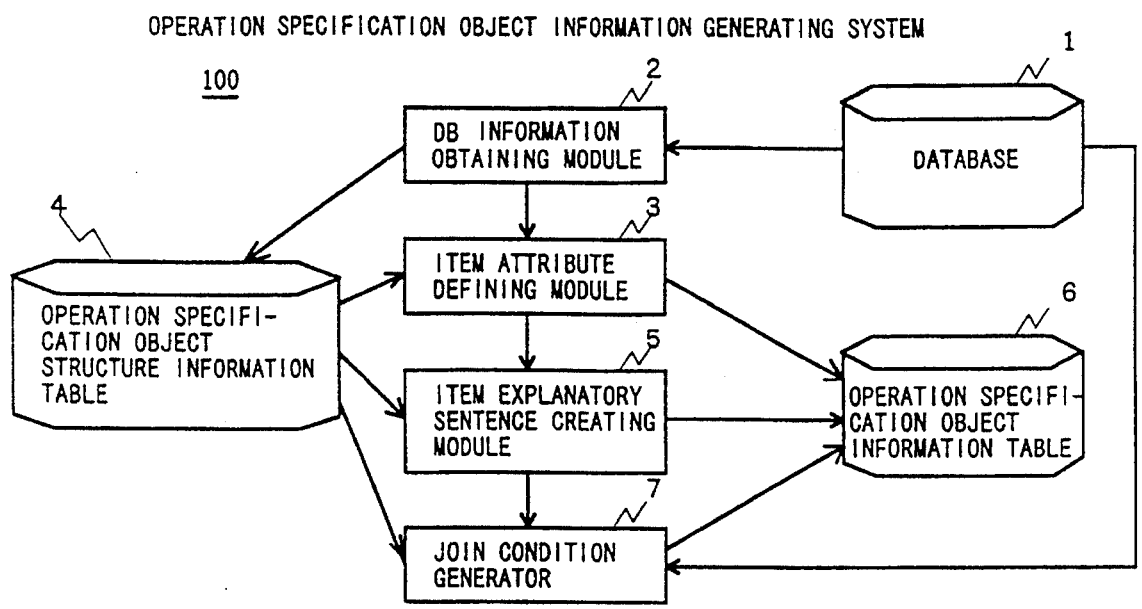
FIG. 1 is a block diagram of an embodiment of an operation specification object information generating system of the present invention.

FIG. 1 is a block diagram showing the function structure of an embodiment of an operation specification object information generating system of the present invention.

In the operation specification object information generating system 100, a DB information obtaining module 2 refers to a database 1, obtains the database table, columns, and attributes of the columns, and registers them in an operation specification object structure information table 4.

An item attribute defining module 3 refers to the operation specification object structure information table 4, obtains the unit word in correspondence with the column value of each column from a user, furthermore obtains the interrogative pronoun in correspondence with the case that it is selected as a retrieval object of each column from the user, and registers them in an operation specification object information table 6. In this case, the unit words are, for example, "yen", "cm", "san", "sama", etc. The interrogative pronouns are, for example, "who", "when", "where", "how much", "how many", "what", etc.

An item explanatory sentence creating module 5 refers to the operation specification object structure information table 4, obtains the explanatory sentence for each column from the user, and registers them in the operation specification object information table 6.

A join condition generator 7 refers to the operation specification object structure information table 4 and database 1, generates a column pair candidate when designating the join condition for operating the database which is an operation specification object, obtains the column pair selected by the user, and registers them in the operation specification object information table 6.

The DB information obtaining module 2, item attribute defining module 3, item explanatory sentence creating module 5, and join condition generator 7 are logical blocks which are separated for each processing function. The database 1, operation specification object structure information 4, and operation specification object information 6 are files or tables.

Since the operation specification object information generating system 100 is separated into logical blocks for each function as mentioned above, an LSI can be formed for each logical block and the processing can be speeded up.

Figure 2:
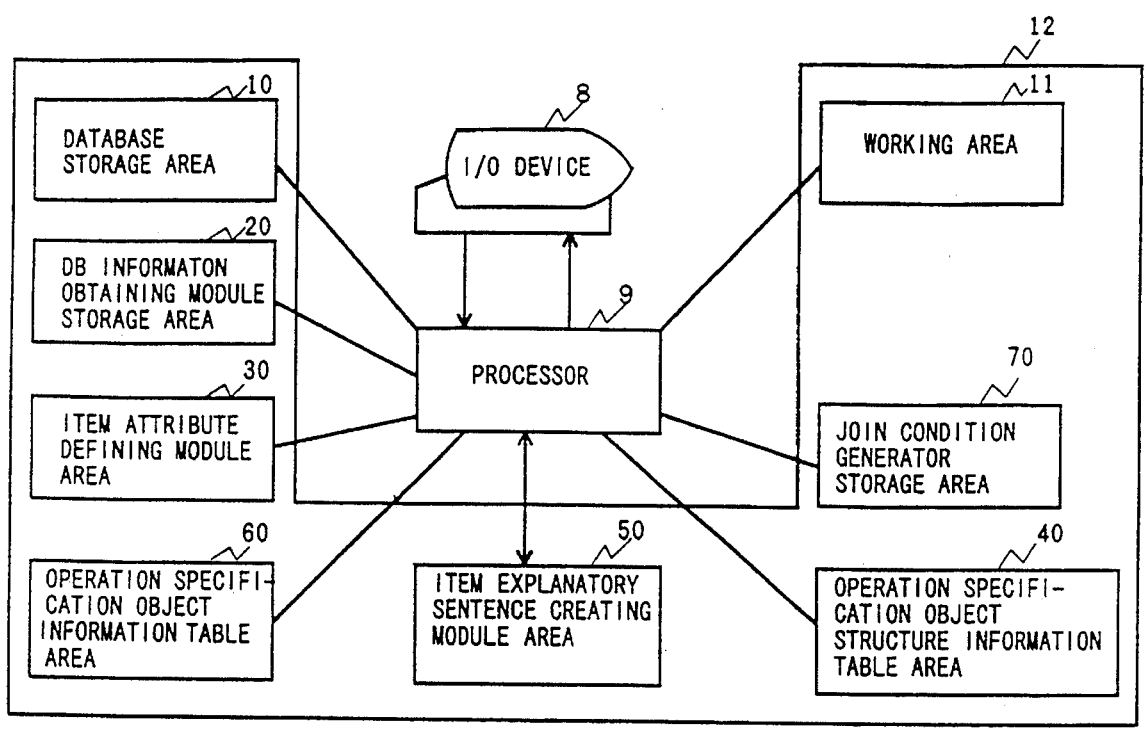
FIG. 2 is a hardware block diagram of the operation specification object information generating system shown in FIG. 1.

FIG. 2 is a block diagram showing the hardware structure of the above operation specification object information generating system 100.

An I/O device 8 inputs specifications, programs, and data and outputs and displays various types of information.

A processor 9 executes each processing shown in FIG. 1.

A storage 12 has a database storage area 10 for storing the database 1, the tables 4 and 6, and the modules 2, 3, 5, and 7 shown in FIG. 1, an operation specification object structure information table area 40, an operation specification object information table area 60, a DB information obtaining module storage area 20, an item attribute defining module area 30, an item explanatory sentence creating module area 50, and a join condition generator storage area 70. In addition, the storage 12 has a working area 11.

FIG. 3 shows an example of the database 1.

The database 1 comprises two tables such as a goods table 1—1 and a shop table 1-2. The goods table 1—1 comprises three columns such as "good name", "price", and "shop name".

The shop table 1-2 comprises five columns such as "shop name", "location", "owner's name", "regular holiday", and "annual turnover".

Figure 4:
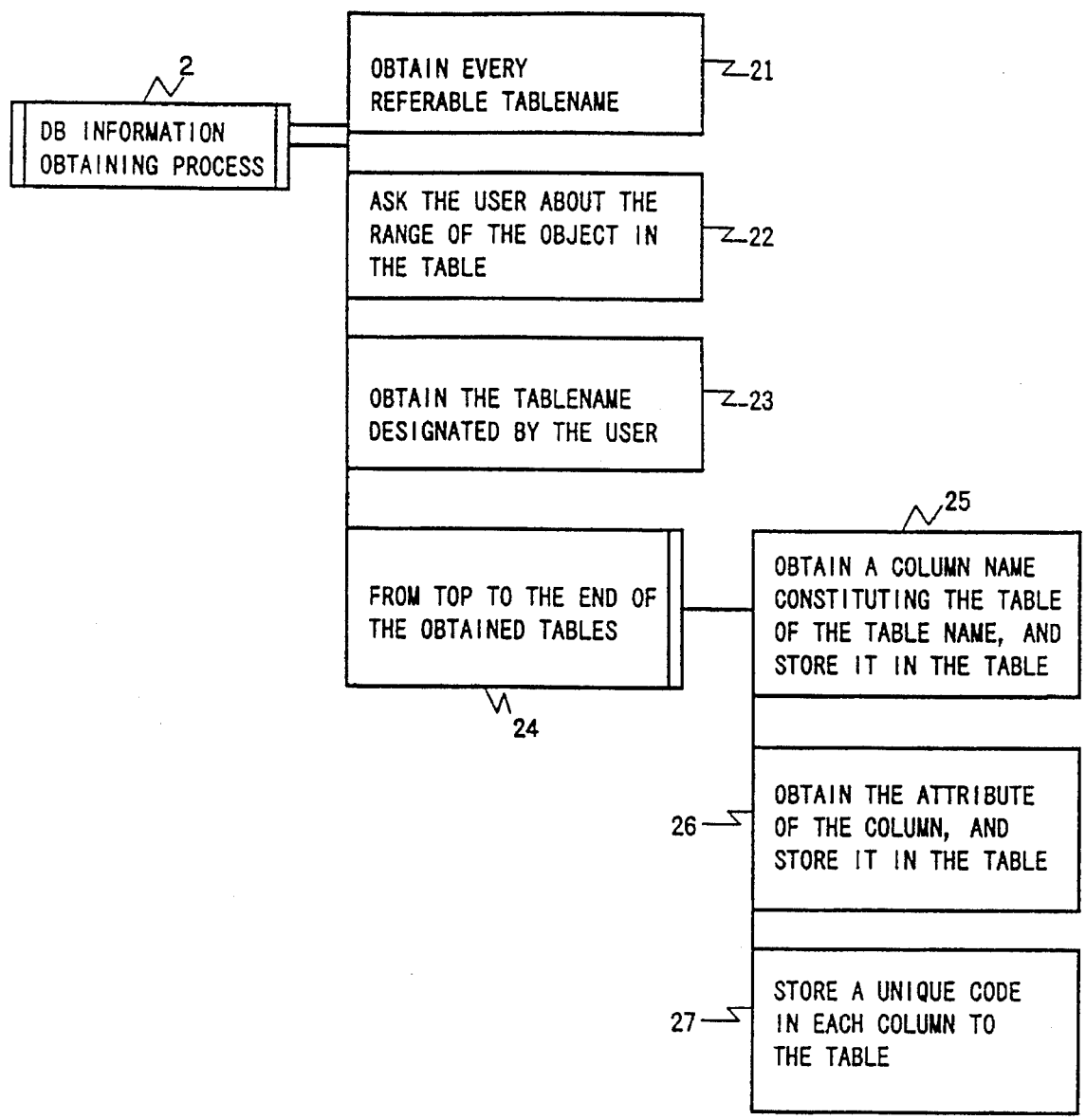
FIG. 4 is a PAD diagram showing the operation of the DB information obtaining module shown in FIG. 1.

FIG. 4 is a PAD diagram showing the operation of the DB information obtaining module 2.

Firstly, the DB information obtaining module 2 obtains every referable table name of the database 1 (Step 21). Next, the DB information obtaining module 2 asks the user about the operation specification object table (Step 22) and obtains the table name designated by the user (Step 23). In this example, it is assumed that the goods table 1—1 and the shop table 1-2 shown in FIG. 3 are obtained as a table name.

Next, the DB information obtaining module 2 executes Steps 25, 26, and 27 for each table of the obtained table name (Step 24).

The DB information obtaining module 2 stores the table names of the taken-up table in the table name column K1 of the operation specification object structure information table 4 shown in FIG. 5 and the column names constituting the table in the item name column K2 (Step 25).

Next, the DB information obtaining module 2 stores the attribute of each column in the attribute column K3 (Step 26).

Next, the DB information obtaining module 2 stores the codes in the item code column K4 so that they are not duplicated.

By doing this, the operation specification object structure information table 4 shown in FIG. 5 is obtained from the database 1 shown in FIG. 3.

Figure 6:
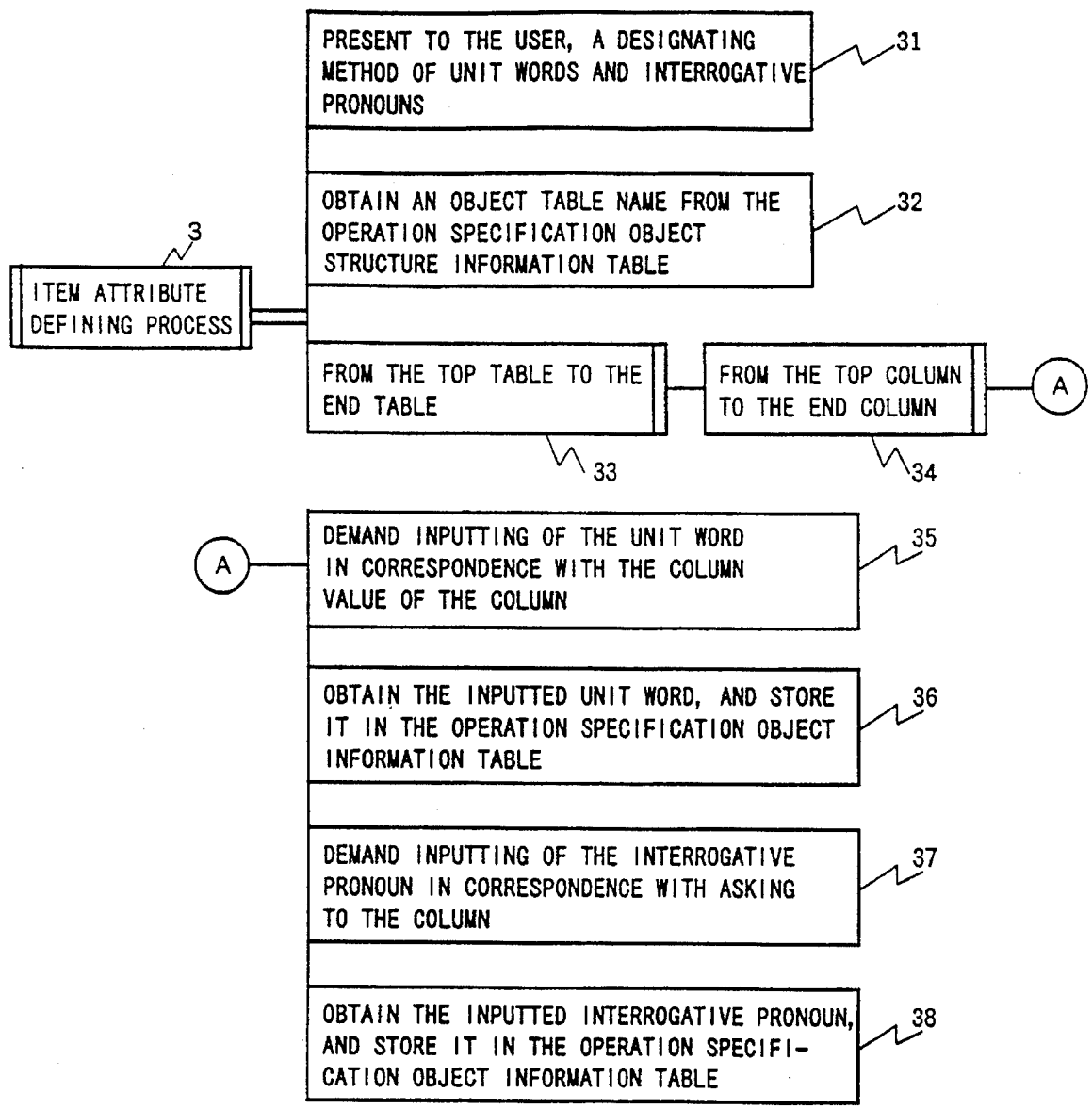
FIG. 6 is a PAD diagram showing the operation of the item attribute defining module shown in FIG. 1.

FIG. 6 is a PAD diagram showing the operation of the item attribute defining module 3.

Firstly, the item attribute defining module 3 presents an explanation sentence indicating a method for designating a unit word to the user as shown in FIG. 12 and presents an explanation sentence indicating a method for designating an interrogative pronoun to the user as shown in FIG. 13 (Step 31).

Next, the item attribute defining module 3 obtains the operation specification object table name with reference to the operation specification object structure information table 4 (Step 32).

Next, the item attribute defining module 3 executes Step 34 for each table of the obtained table name (Step 33).

The item attribute defining module 3 executes Steps 35 to 39 from the top column of the taken-up table to the end column (Step 34).

The item attribute defining module 3 demands the user to input the unit word in correspondence with the column value of the taken-up column (Step 35). The item attribute defining module 3 obtains the unit word which is inputted by the user and registers it in the unit word column H3 of the operation specification object information table 6 shown in FIG. 7 (Step 36).

Next, the item attribute defining module 3 demands the user to input the interrogative pronoun in correspondence with the case that the taken-up column is selected as a retrieval object (Step 37). The item attribute defining module 3 obtains the interrogative pronoun which is inputted by the user and registers it in the interrogative pronoun column H4 of the operation specification object information table 6 shown in FIG. 7 (Step 38).

By doing this, the operation specification object information table 6 shown in FIG. 7 is obtained from the operation specification object structure information table 4 shown in FIG. 5 and the unit words and interrogative pronouns which are inputted by the user.

In this embodiment, interrogative pronouns such as "where" and "who" are obtained. However, the case information represented by the column such as "location" instead of "where" and "person" instead of "who" may be obtained from the user.

Figure 8:
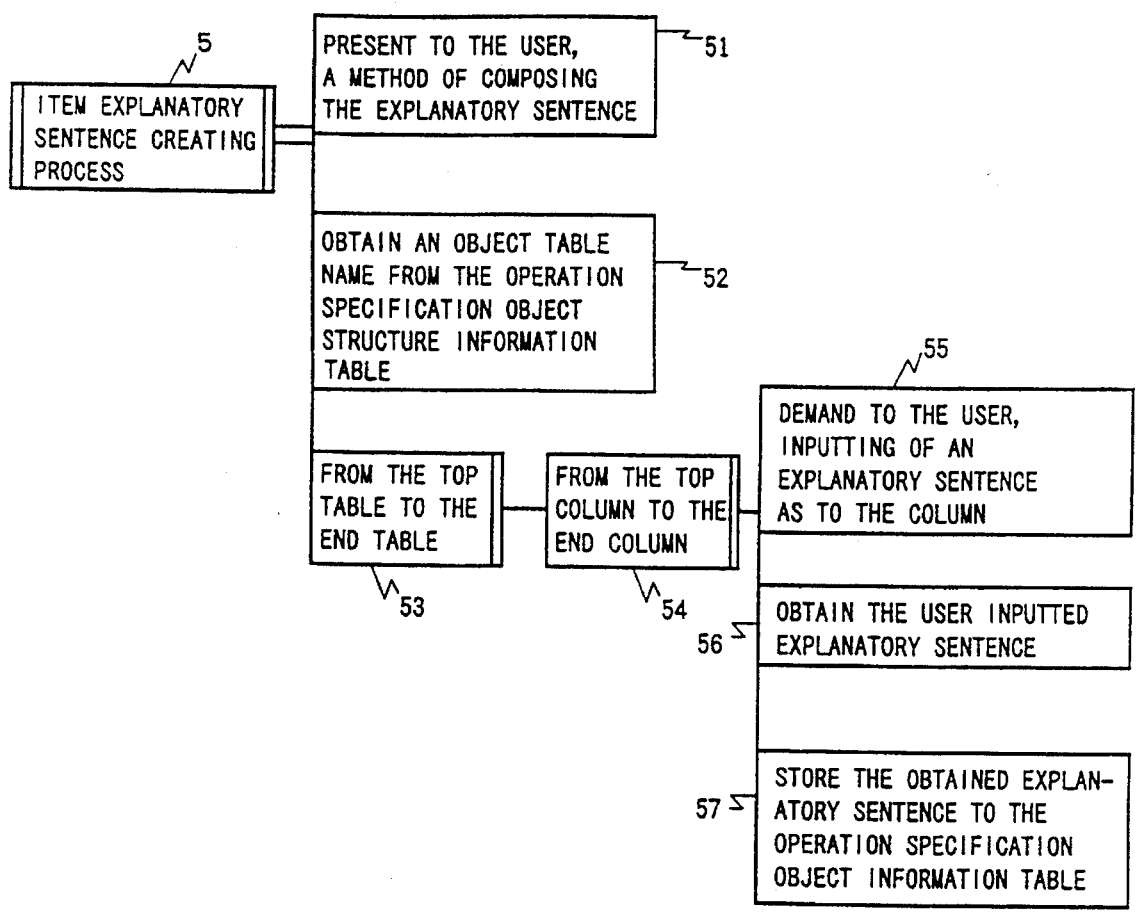
FIG. 8 is a PAD diagram showing the operation of the item explanatory sentence creating module shown in FIG. 1.

FIG. 8 is a PAD diagram showing the operation of the item explanatory sentence creating module 5. Firstly, the item explanatory sentence creating module 5 presents a method for composing an explanation sentence to the column to the user as shown in FIG. 14 (Step 51).

Next, the item explanatory sentence creating module 5 obtains the operation specification object table name with reference to the operation specification object structure information table 4 (Step 52).

Next, the item explanatory sentence creating module 5 executes Step 54 for each table of the obtained table name (Step 53).

The item explanatory sentence creating module 5 executes Steps 55 to 57 from the top column of the taken-up table to the end column (Step 54).

The item explanatory sentence creating module 5 demands the user to input the explanatory sentence for the taken-up column (Step 55). The item explanatory sentence creating module 5 obtains the explanatory sentence which is inputted by the user (Step 56) and registers it in the explanatory sentence column H5 of the operation specification object information table 6 shown in FIG. 9 (Step 57).

By doing this, the operation specification object information table 6 shown in FIG. 9 is obtained from the operation specification object information table 6 shown in FIG. 7 and the explanatory sentence which is inputted by the user.

In this embodiment, the explanatory sentence is stored as it is. However, the explanatory sentence may be stored in a form that it is divided into the column name and postpositional words, declinable words, and syntax information in correspondence with the column name.

Figure 10:
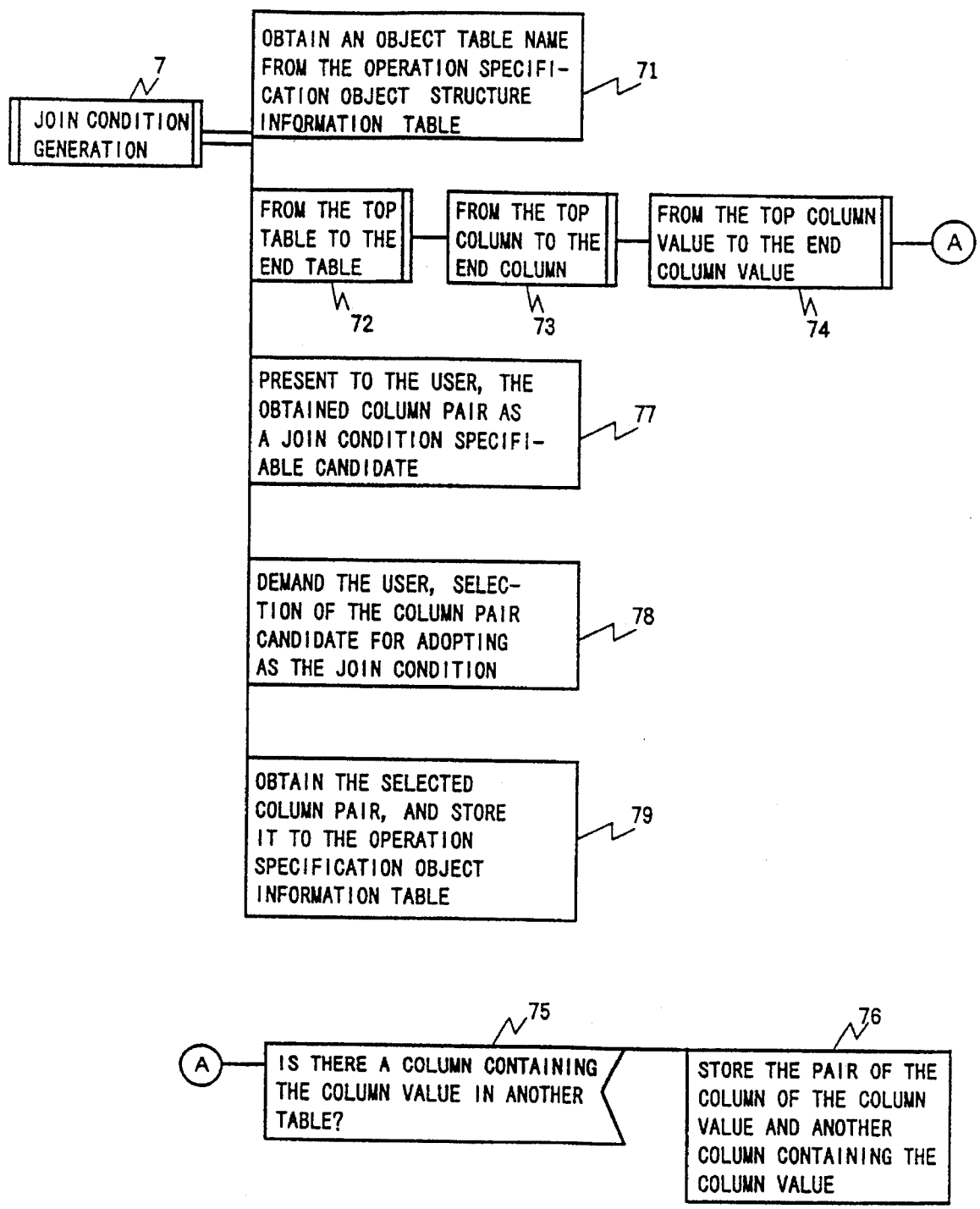
FIG. 10 is a PAD diagram showing the operation of the join condition generator shown in FIG. 1.

FIG. 10 is a PAD diagram showing the operation of the join condition generator 7.

Firstly, the join condition generator 7 obtains the operation specification object table name with reference to the operation specification object structure information table 4 (Step 71).

Next, the join condition generator 7 executes Step 73 for each table of the obtained table name (Step 72).

The join condition generator 7 executes Step 74 for each column of the taken-up table (Step 73). The join condition generator 7 executes Steps 75 and 76 from the top column value of the taken-up column to the end column value (Step 74).

The join condition generator 7 discriminates whether the column containing the taken-up column value exists in another table (Step 75). When it does, the join condition generator 7 obtains a pair of the column corresponding to the column value and the column containing the column value which exists in another table (Step 76).

Next, the join condition generator 7 presents the obtained column pair to the user as a column pair candidate for which a join condition can be designated (Step 77) and demands the user to select it (Step 78).

Next, the join condition generator 7 obtains each column of the column pair selected by the user, obtains the item codes of the columns, and stores the item code at the location corresponding to the column pair in the join item column H6 corresponding to each column in the operation specification object information table 6 shown in FIG. 11 (Step 79).

By doing this, in addition to the operation specification object information table 6 shown in FIG. 9, the operation specification object information table 6 shown in FIG. 11 is obtained from the column pair selected by the user.

As mentioned above, according to the operation specification object information generating system 100 of this embodiment, operation specification object information for establishing a correspondence between the database which is an object of natural language analysis and the analytical result of the natural language can be registered simply so that the burden imposed on the user is lightened.

Next, a use example of operation specification object information will be explained.

Figures 15, 16:
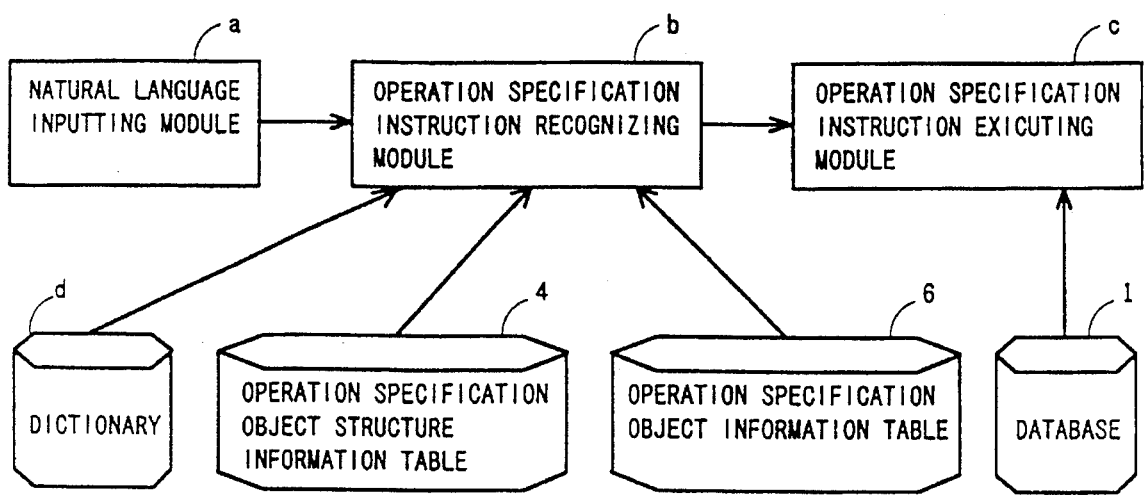
FIG. 15 is a block diagram of a natural language database system containing an operation specification object recognizing system of the present invention.
FIG. 16 is an illustration of an input sentence to the system shown in FIG. 15.

FIG. 15 shows an example of a natural language database system 1500 which refers to operation specification object information generated by the operation specification object information generating system of the present invention.

The natural language database system 1500 consists of a database 1, an operation specification object structure information table 4, an operation specification object information table 6, a natural language inputting module a for inputting natural language, an operation specification instruction recognizing module b for recognizing an operation specification instruction from the inputted natural language, an operation specification instruction executing module c for operating the database 1 according to the recognized operation specification instruction, and a dictionary d.

FIG. 16 shows examples of input sentences which are inputted from the natural language inputting module a.

Input sentence 1 is a use example of an interrogative pronoun of "how much". It is assumed that it is found in the input sentence 1 that "miso-raamen" is a good name and "how much" is an interrogative pronoun. By referring to the table name column K1, the item name column K2, and the item code column K4 of the operation specification object structure information table 4 shown in FIG. 5, it is found that the item name "good name" corresponds to the item code "A1" in the "goods table" 1—1. By referring to the item code column H2 and the interrogative pronoun column H4 in the operation specification object information table 6 shown in FIG. 11, it is found that the interrogative pronoun "how much" corresponds to two item codes "A2" and "B5". Furthermore, by referring to the table name column K1 and the item code column K4 of the operation specification object structure information table 4 shown in FIG. 5, it is found that the item code "A2" corresponds to the "goods table" 1—1 and the item code "B5" corresponds to the "shop table" 1–2. Under the condition that "an interrogative pronoun indicates an item in the same table as that of another word in the input sentence but a different item", the item code "A2" is selected. Therefore, by referring to the item name column K2 and the item code column K4 of the operation specification object structure information table 4 shown in FIG. 5, it is found that the interrogative pronoun "how much" indicates the item name "price" of the item code "A2". By doing this, the correspondence between the input sentence 1 and the database 1 can be recognized.

Input sentence 2 is a use example of an interrogative pronoun of "where". It is assumed that it is found in the input sentence 2 that "Hitachihanten" is a shop name and "where" is an interrogative pronoun. By referring to the table name column K1, the item name column K2, and the item code column K4 of the operation specification object structure information table 4 shown in FIG. 5, it is found that the item name "shop name" corresponds to the item code "A3" in the "goods table" 1—1 and the item code "B1" in the "shop table" 1–2. By referring to the item code column H2 and the interrogative pronoun column H4 in the operation specification object information table 6 shown in FIG. 11, it is found that the interrogative pronoun "where" corresponds to three item codes "A3", "B1", and "B2". Furthermore, by referring to the table name column K1 and the item code column K4 of the operation specification object structure information table 4 shown in FIG. 5, it is found that the item code "A3" corresponds to the "goods table" 1—1, and the item code "B1" corresponds to the "shop table" 1–2, and the item code "B2" corresponds to the "shop table" 1–2. Under the condition that "an interrogative pronoun indicates an item in the same table as that of another word in the input sentence but a different item" the item code "B2" is selected Therefore, by referring to the item name column K2 and the item code column K4 in the operation specification object structure information table 4 shown in FIG. 5, it is found that the interrogative pronoun "where" indicates the item name "location" of the item code "B2". By doing this, the correspondence between the input sentence 2 and the database 1 can be recognized. Input sentence 3 is a use example of a unit word of "san".

It is assumed that it is found in the input sentence 3 that "san" is a unit word. By referring to the item code column H2 and the unit word column H3 in the operation specification object information table 6 shown in FIG. 11, it is found that the unit word "san" corresponds to the item code "B3". Therefore, by referring to the item name column K2 and the item code column K4 in the operation specification object structure information table 4 shown in FIG. 5, it is found that a word of "Hitachi Taro" accompanied by the unit word "san" indicates the item name "owner's name" of the item code "B3". By doing this, the correspondence between the input sentence 3 and the database 1 can be recognized.

Input sentence 4 is a use example of a unit word of "yen". It is assumed that it is found in the input sentence 4 that "yen" is a unit word and "good" indicates the item "good name" in the "goods table" 1—1. By referring to the operation specification object information table 6 shown in FIG. 11, it is found that the unit word "yen" corresponds to the item codes "A2" and "B5". Furthermore, by referring to the operation specification object structure information table 4 shown in FIG. 5, it is found that the item code "A2" corresponds to the "goods table" 1—1 and the item code "B5" corresponds to the "shop table" 1–2. Under the condition that "the item in the same table as that of the word of the just behind phrase is selected" the item code "A2" in the "goods table" 1—1 in which the word of the just behind phrase "good" is found is selected. Therefore, by referring to the operation specification object structure information table 4 shown in FIG. 5, it is found that a word of "500" accompanied by the unit word "yen" indicates the item name "price" of the item code "A2". By doing this, the correspondence between the input sentence 4 and the database 1 can be recognized.

Input sentence 5 is a use example of an explanatory sentence of "operating". The input sentence 5 says in Japanese as "Tsurukame-kissa wo keieishite iru hito wa?", which means "a person operating Tsurukame tea shop is?" as shown in FIG. 16. It is assumed that it is found in the input sentence 5 that "operating" is an explanatory sentence, and "teehouse Tsurukame" is "shop name" in the "shop table" 1–2, and "person" is "owner's name" in the "shop table" 1–2. By referring to the explanatory sentence column H5 in the operation specification object information table 6 shown in FIG. 11, it is found that the declinable word "operating" corresponds to the item codes "B1" and "B3". Since the postpositional word "o" in correspondence with "teehouse Tsurukame" is equal to the postpositional word "o" in correspondence with the item name "shop name" in the explanatory sentence column H5 of the item code "B3", it is found that "operating" indicates the item name "owner's name" of the item code "B3". By doing this, the correspondence between the input sentence 5 and the database 1 can be recognized. Since the item name accompanied by the same postpositional word as the postpositional word "o" in correspondence with "teehouse Tsurukame" is "shop name", it can be inferred that "teehouse Tsurukame" is a word representing "shop name". Therefore, it is not always necessary that it is found that "teehouse Tsurukame" is "shop name" in the "shop table" 1–2.

Input sentence 6 is another use example of an explanatory sentence of "operating". It is assumed that it is found in the input sentence 6 that "operating" is an explanatory sentence, and "Tsurukame Jiro" is "owner's name" in the "shop table" 1–2, and "shop" is "shop name" in the "shop table" 1-2. By referring to the explanatory sentence column H5 in the operation specification object information table 6 shown in FIG. 11, it is found that the declinable word "operating" corresponds to the item codes "B1" and "B3". Wherein, column H5 corresponding to the item code "B1" says in Japanese, as "mise no namae" and ""tenshumei" ga keieishite iru mise"", which are meant "name of the shop" and "shop operated by the "owner's name"" respectively as shown in FIG. 11. And corresponding to the item code "B3", says in Japanese, as ""tenmei" no tenshumei", ""tenmei" no shujin no namae", and ""tenmei" wo keieishite iru hito", which are meant" "owner's name" of the "shop name"", ""master's name of the shop name"", and "a person operating the "shop name"" respectively as shown in FIG. 11. Since the postpositional word "ga" in correspondence with "Tsurukame Jiro" is equal to the postpositional word "ga" in correspondence with the item name "owner's name" in the explanatory sentence column H5 of the item code "B1", it is found that "operating" indicates the item name "shop name" of the item code "B1". By doing this, the correspondence between the input sentence 6 and the database 1 can be recognized. Wherein the sentence 6 says in Japanese as "Tsurukame Jiro ga keieishite iru mise wa?", which means "the shop Tsurukame Jiro is operating is?" as shown in FIG. 16.

Since the item name accompanied by the same postpositional word as the postpositional word "ga" in correspondence with "Tsurukame Jiro" is "owner's name", it can be inferred that "Tsurukame Jiro" is a word representing "owner's name". Therefore, it is not always necessary that it is found that "Tsurukame Jiro" is "owner's name" in the "shop table" 1–2.

Input sentence 7 is a use example of the join condition. It is assumed that it is found in the input sentence 7 that "Hitachi Taro" is "owner's name" in the "shop table" 1–2, and "shop" is "shop name" in the "shop table" 1–2, and "good" is "good name" in the "goods table" 1—1. It is found that this input sentence 7 represents a retrieval instruction covering both tables such as the "goods table" 1—1 and the "shop table" 1–2. To designate the join condition between the two tables, the operation specification object information table 6 shown in FIG. 11 is referred to and "shop name" (A3) in the "goods table" 1—1 and "shop name" (B1) in the "shop table" 1–2 are obtained as a join condition. By doing this, the join condition between the tables can be recognized.

As mentioned above, according to the above natural language database system 1500, by referring to the operation specification object information generated by the operation specification object information generating system of the present invention, the correspondence between words of an input sentence in natural language and the database 1 can be recognized. For an unknown word as operation specification information, precise operation specification information can be inferred.

Furthermore, there is no need for the user to perform operations such as fixing a complicated correspondence between declinable words and operation specification objects or defining the meanings of declinable words and operation specification objects. Therefore, a natural language interface for operating the database can be realized easily.

According to the above embodiment, interrogative pronouns and unit words are inputted interactively. However, an interrogative pronoun table and unit word table may be prepared so as to input interrogative pronouns and unit words from them.

FIG. 17 shows an example of an interrogative pronoun table G1 and FIG. 18 shows an example of a unit word table T1.

FIG. 19 shows a screen example for the user to input an interrogative pronoun using the interrogative pronoun table G1. Interrogative pronouns are obtained and displayed from the interrogative pronoun table G1 and the user is demanded to select one of them. By doing this, the user can input the interrogative pronoun corresponding to the column only by selecting it from the interrogative pronouns displayed on the screen without thinking and inputting the interrogative pronoun corresponding to the column.

FIG. 20 shows a screen example for the user to input a unit word using the unit word table T1. Unit words are obtained and displayed from the unit word table T1 and the user is demanded to select one of them. By doing this, the user can input the unit word corresponding to the column only by selecting it from the unit words displayed on the screen without thinking and inputting the unit word corresponding to the column.

Effects of the Invention

According to the operation specification object information generating system of the present invention, the burden imposed on the user is lightened and operation specification object information can be generated simply.

According to the operation specification object recognizing system of the present invention, the user can instruct an operation to the processor by an input sentence in natural language without performing a complicated defining process for an operation specification object.

What is claimed is:

1. A method for generating operation specification object information comprising information about a plurality of items in an operation specification object, in a system having a function for converting an input sentence, input by a user and which represents an operation specification which is input to said operation specification object, wherein said operation specification object has at least one table having said plurality of items, to an operation specification instruction wherein said operation specification instruction comprises a command for executing an operation in the system which may be interpreted by said operation specification object, said method comprising the steps of:

performing at least one of a plurality of defining steps, said defining steps comprising:

defining a first relationship between a word in each of said items in said operation specification object and one of a plurality of unit words;

defining a second relationship between each of said items in said operation specification object and one of a plurality of interrogative pronouns wherein said interrogative pronoun identifies the item as a search object when said operation specification object is searched; and identifying that an item exists in both a first table and a second table and defining a third relationship comprising a join condition between said item in said first table and said item in said second table; and generating the operation specification object information on a basis of a result from said step of performing at least one of a plurality of defining steps.

2. The method for generating operation specification object information according to claim 1, further comprising the step of:

for each of said items in said operation specification object, storing an explanatory sentence input by the user which explains said item and defines a correspondence between said item and said input sentence.

3. The method for generating operation specification object information according to claim 2, wherein said explanatory sentence setting step comprises, for each item in said operation specification object:

prompting said user for a natural language sentence explaining said item; and storing said natural language sentence in said item.

4. The method for generating operation specification object information according to claim 3, wherein said natural language sentence comprises at least one word.

5. The method for generating operation specification object information according to claim 3, wherein said natural language sentence comprises a quotation of a second item.

6. The method for generating operation specification object information according to claim 3, wherein said natural language sentence explains said item by quoting a declinable word, said declinable word representing different forms of words having related meanings in said natural language sentence.

7. The method for generating operation specification object information according to claim 1, wherein said step of defining a join condition comprises:

when said word in said item is a second word in a second item in said operation specification object, defining said item and said second item as an item pair which is designated as said join condition.

8. The method for generating operation specification object information according to claim 7, wherein said step of defining a join condition further comprises:

when said word in said first item is equal to said second word in said second item, prompting said user whether to set said item and said second item as said item pair to be designated as said join condition; and when instructed by said user, defining said item pair as said join condition.

9. The method for generating operation specification object information according to claim 1, wherein said step of defining a first relationship comprises, for each item in said operation specification object, the steps of:

prompting said user for an inputted unit word;

defining the unit word as said inputted unit word; and storing the unit word in said item.

10. The method for generating operation specification object information according to claim 1, wherein said step of defining a first relationship comprises, for each item in said operation specification object, the steps of:

displaying a list, to said user, having at least one predefined unit word;

prompting the user to select the predefined unit word corresponding with the word in said item;

defining the predefined unit word as the unit word; and storing the unit word in said item.

11. The method for generating operation specification object information according to claim 1, wherein said step of defining a second relationship comprises, for each item in said operation specification object, the steps of:

prompting said user for the interrogative pronoun;

obtaining the interrogative pronoun from said user; and storing the interrogative pronoun in said item.

12. The method for generating operation specification object information according to claim 1, wherein said step of defining a second relationship comprises, for each item in said operation specification object, the steps of:

displaying a list of at least one predefined interrogative pronoun to said user and prompting the user to select an inputted interrogative pronoun, from said list, which represents a search term for the item; and storing the inputted interrogative pronoun in said item.

13. A method for recognizing an operation specification instruction from an input sentence, wherein said operation specification instruction comprises a command for executing an operation in a system having a function for converting the input sentence to said operation specification instruction, wherein said input sentence represents an operation specification being input to an operation specification object having a plurality of items subject to the operation specification instruction, and wherein said operation specification instruction operates on said operation specification object, said method comprising the steps of:

performing at least one of a plurality of defining steps, said defining steps comprising:

defining a first relationship between a word in each of said items in said operation specification object and one of a plurality of unit words;

defining a second relationship between each of said items in said operation specification object and one of a plurality of interrogative pronouns wherein said interrogative pronoun identifies an item as a search object when said operation specification object is searched; and identifying that said each of said items exists in both a first table and a second table, and defining a third relationship comprising a join condition between each of said items in said first table which also exist in said second table;

generating operation specification object information, said operation specification object information being information in said items of said operation specification object, on a basis of a result from said step of performing at least one of the plurality of defining steps;

detecting said unit word in said input sentence;

obtaining the item corresponding to said unit word by referencing said operation specification object information; and recognizing said word in said item as representative of said unit word.

14. A method for recognizing an operation specification instruction, wherein said operation specification instruction comprises a command for executing an operation in a system having a function for converting an input sentence, representing an operation specification being input to an operation specification object having a plurality of items, to said operation specification instruction for operating on said operation specification object, said method comprising the steps of:

performing at least one of a plurality of defining steps, said defining steps comprising:

defining a first relationship between a word in each of said items in said operation specification object and one of a plurality of unit words;

defining a second relationship between each of said items in said operation specification object and one of a plurality of interrogative pronouns wherein said interrogative pronoun identifies an item as a search object when said operation specification object is searched; and identifying that said each of said items exists in both a first table and a second table, and defining a third relationship comprising a join condition between each of said items in said first table which also exist in said second table;

generating operation specification object information, said operation specification object information being information in said items of said operation specification object, on a basis of a result from said step of performing at least one of a plurality of defining steps;

detecting if said interrogative pronoun exists in said input sentence;

obtaining the item corresponding to said interrogative pronoun by referencing said operation specification object information; and recognizing said item as a retrieval object item.

15. A method for recognizing an operation specification instruction from a Japanese input sentence, wherein said operation specification instruction comprises a command for executing an operation in a system having a function for converting the Japanese input sentence to said operation specification instruction, wherein said Japanese input sentence represents an operation specification being input to an operation specification object having a plurality of items subject to the operation specification instruction and wherein said operation specification instruction operates on said operation specification object, said method comprising the steps of:

performing at least one of a plurality of defining steps, said defining steps comprising:

defining a first relationship between a word in each of said items in said operation specification object and one of a plurality of unit words;

defining a second relationship between each of said items in said operation specification object and one of a plurality of interrogative pronouns wherein said interrogative pronoun identifies an item as a search object when said operation specification object is searched; and identifying that said each of said items exists in both a first table and a second table, and defining a third relationship comprising a join condition between each of said items in said first table which also exist in said second table;

generating operation specification object information, said operation specification object information being information in said items of said operation specification object, on a basis of a result from said step of performing at least one of the plurality of defining steps;

detecting if a declinable word, representing different forms of words in said Japanese input sentence, exists in said Japanese input sentence;

obtaining the item corresponding to an explanatory sentence containing said declinable word by referencing said operation specification object information; and recognizing a word in said item corresponding to said declinable word.

16. A method for recognizing an operation specification instruction from a Japanese sentence, wherein said operation specification instruction comprises a command for executing an operation in a system having a function for converting the Japanese input sentence to said operation specification instruction, wherein said Japanese input sentence represents an operation specification being input to an operation specification object having a plurality of items subject to the operation specification instruction and wherein said operation specification instruction operates on said operation specification object, said method comprising the steps of:

performing at least one of a plurality of defining steps, said defining steps comprising:

defining a first relationship between a word in each of said items in said operation specification object and one of a plurality of unit words;

defining a second relationship between each of said items in said operation specification object and one of a plurality of interrogative pronouns wherein said interrogative pronoun identifies an item as a search object when said operation specification object is searched; and identifying that said each of said items exists in both a first table and a second table, and defining a third relationship comprising a join condition between each of said items in said first table which exist in said second table;

generating operation specification object information, said operation specification object information being information in said items of said operation specification object, on a basis of a result from said step of performing at least one of a plurality of defining steps;

detecting if a declinable word, representing different forms of words having related meanings in said Japanese input sentence, exists in said Japanese input sentence;

obtaining an explanatory sentence containing said declinable word by referencing said operation specification object information;

detecting whether a postpositional word, said postpositional word describing words in said explanatory sentence, exists in the Japanese input sentence; and recognizing an input word in the Japanese input sentence, which is accompanied by said postpositional word, as said word in the item.

17. A system for generating operation specification object information, wherein said operation specification object information comprises information about a plurality of items in an operation specification object, in a system having a function for converting an input sentence, representing an operation specification being input to said operation specification object, to an operation specification instruction for operating on said operation specification object, said system comprising:

at least one of a plurality of defining means, said defining means comprising: a first defining means for defining a first correspondence between a word in each item in said operation specification object and a unit word; a second defining means for defining a second correspondence between each item in said operation specification object and one of a plurality of interrogative pronouns wherein said interrogative pronoun identifies the item as a search object when said operation specification object is searched; and a third defining means for defining a join condition between said item, which exists in a first table and a second table of said operation specification object; and means for generating the operation specification object information on a basis of a result from said at least one of said plurality of defining means.

18. A system for recognizing an operation specification instruction, wherein said operation specification instruction comprises a command for executing an operation in a system having a function for converting an input sentence, representing an operation specification being input to an operation specification object having a plurality of items, to said operation specification instruction for operating on said operation specification object, said system comprising:

at least one of a plurality of defining means, said defining means comprising: a first defining means for defining a first correspondence between a word in each item in said operation specification object and a unit word; a second defining means for defining a second correspondence between each item in said operation specification object and one of a plurality of interrogative pronouns wherein said interrogative pronoun identifies each item as a search object when said operation specification object is searched; and a third defining means for defining a join condition between said item, which exists in a first table and a second table of said operation specification object;

means for generating operation specification object information, wherein said operation specification object information is information about said plurality of items in said operation specification object, on a basis of a result from said at least one of said plurality of defining means;

means for detecting if the unit word exists in said input sentence;

means for obtaining the item corresponding to said unit word by referencing said operation specification object information; and means for recognizing a word in said item representative of said unit word.

19. A system for recognizing an operation specification instruction, wherein said operation specification instruction comprises a command for executing an operation in a system having a function for converting an input sentence, representing an operation specification being input to an operation specification object having a plurality of items, to said operation specification instruction for operating on said operation specification object, said system comprising:

at least one of a plurality of defining means, said defining means comprising:
a first defining means for defining a first correspondence between a word in each item in said operation specification object and a unit word;
a second defining means for defining a second correspondence between each item in said operation specification object and one of a plurality of interrogative pronouns wherein said interrogative pronoun identifies each item as a search object when said operation specification object is searched; and
a third defining means for defining a join condition between said item, which exists in a first table and a second table of said operation specification object;

means for generating operation specification object information, wherein said operation specification object information is information about said plurality of items in said operation specification object, on a basis of a result from said at least one of said plurality of defining means;

means for detecting if said interrogative pronoun exists in said input sentence;

means for obtaining the item corresponding to said interrogative pronoun by referencing said operation specification object information; and means for recognizing said item as a retrieval object item.

20. A system for recognizing an operation specification instruction, wherein said operation specification instruction comprises a command for executing an operation in a system having a function for converting a Japanese input sentence, representing an operation specification being input to an operation specification object having a plurality of items, to said operation specification instruction for operating on said operation specification object, said system comprising:

at least one of a plurality of defining means, said defining means comprising: a first defining means for defining a first correspondence between a word in each item in said operation specification object and a unit word; a second defining means for defining a second correspondence between each item in said operation specification object and one of a plurality of interrogative pronouns wherein said interrogative pronoun identifies the item as a search object when said operation specification object is searched; and a third defining means for defining a join condition between said item, which exists in a first table and a second table of said operation specification object;

means for generating operation specification object information, wherein said operation specification object information is information about said plurality of items in said operation specification object, on a basis of a result from said at least one of said plurality of defining means;

means for detecting if a declinable word, representing different forms of words having related meanings in said Japanese input sentence, exists in said Japanese input sentence;

means for obtaining the item corresponding to an explanatory sentence containing said declinable word which references said operation specification object information; and means for recognizing said declinable word in said item.

21. A system for recognizing an operation specification instruction, wherein said operation specification instruction comprises a command for executing an operation in a system having a function for converting a Japanese input sentence, representing an operation specification being input to an operation specification object having a plurality of items, to operation specification instruction for operating on said operation specification object, said system comprising:

at least one of a plurality of defining means, said defining means comprising: a first defining means for defining a first correspondence between a word in each item in said operation specification object and a unit word; a second defining means for defining a second correspondence between each item in said operation specification object and one of a plurality of interrogative pronouns wherein said interrogative pronoun identifies the item as a search object when said operation specification object is searched; and a third defining means for defining a join condition between said item, which exists in a first table and a second table of said operation specification object;

means for generating operation specification object information, wherein said operation specification object information is information about said plurality of items in said operation specification object, on a basis of a result from said at least one of said plurality of defining means;

means for detecting if a declinable word, representing different forms of words having related meanings in said Japanese input sentence, exists in said Japanese input sentence;

means for obtaining an explanatory sentence containing said declinable word which references said operation specification object information;

means for detecting a postpositional word, said postpositional word describing a word in said Japanese input sentence, which exists in both said explanatory sentence and the Japanese input sentence; and means for recognizing the word in the Japanese input sentence, which is accompanied by said postpositional word, as said word in the item which is accompanied by the postpositional word.

* * * * *